(12) United States Patent
Lamock et al.

(10) Patent No.: US 6,408,914 B1
(45) Date of Patent: Jun. 25, 2002

(54) PNEUMATIC TIRE WITH LOCKED BEAD CONSTRUCTION

(75) Inventors: André Lamock, Fauvillers (BE); Carlo Bernard, Beringen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/601,931

(22) PCT Filed: Mar. 26, 1998

(86) PCT No.: PCT/US98/06034

§ 371 (c)(1),
(2), (4) Date: Aug. 9, 2000

(87) PCT Pub. No.: WO99/48708

PCT Pub. Date: Sep. 30, 1999

(51) Int. Cl.[7] .......................... B60C 15/00; B60C 15/06
(52) U.S. Cl. ................... 152/543; 152/539; 152/546; 152/552; 152/553; 152/554
(58) Field of Search .............................. 152/552–554, 152/539, 543, 546

(56) References Cited

U.S. PATENT DOCUMENTS

| | | |
|---|---|---|
| 4,854,361 A | 8/1989 | Gasowski et al. |
| 4,890,660 A | 1/1990 | Lamock |
| 4,922,985 A | 5/1990 | Gasowski et al. |
| 4,967,821 A | 11/1990 | Holroyd et al. |
| 5,058,649 A | 10/1991 | Hoang et al. |
| 5,415,216 A | 5/1995 | Kajiwara et al. |
| 5,524,688 A | 6/1996 | Trares et al. |

FOREIGN PATENT DOCUMENTS

| | | | |
|---|---|---|---|
| EP | 0287497 A2 | 10/1988 | |
| JP | 64030808 A | * 2/1989 | .................. 152/539 |
| WO | WO 92/12020 | 7/1992 | |

OTHER PUBLICATIONS

Patent Abstracts of Japan, vol. 017, No. 439 (M–1462), Aug. 13, 1993 and JP 05 096905 A (Sumitomo Rubber Ind Ltd), Apr. 20, 1993.

* cited by examiner

Primary Examiner—Adrienne C. Johnstone
(74) Attorney, Agent, or Firm—David L King

(57) ABSTRACT

A tire (10) has three carcass reinforcing structures (15, 16, 17). The second carcass reinforcing structure (16) is folded radially outwardly around each bead core 16 (20), so that the edges (36) of the second carcass reinforcing structure (16) are each located between an apex (31) and the neighboring bead core. The third carcass reinforcing structure (17) has its turndown portions (27) folded radially inwardly around the turnup portion of the second carcass reinforcing structure (16) and the bead core, so that the edges (37) of the plies of the third carcass reinforcing structure are located at the radially inner side of the bead cores (20). The first carcass reinforcing structure (15) has its turnup portions (25) folded radially outwardly around each bead core, the turnupportion of the second carcass reinforcing A structure (16) and the turndown portion of the third carcass reinforcing structure (17) so that the edges (35) of the plies of the first carcass reinforcing structure are located near the radially outer portion of the apex (31).

13 Claims, 5 Drawing Sheets

PNEUMATIC TIRE WITH LOCKED BEAD CONSTRUCTION

TECHNICAL FIELD

The present invention relates to the bead portion of a pneumatic tire, and more specifically of a tire for heavy duty use, comprising a bead core with a round or polygonal shape, an apex, a carcass comprising three reinforcing structures, comprising each at least one reinforcing ply.

BACKGROUND ART

Radial carcass tires for heavy duty use are often used under heavy load conditions which place the components within a tire under severe stress. The bead regions of such tires are particularly subject to large deformations caused by flexing of the sidewalls which can produce sheer stresses between the carcass plies and heat build-up.

The desirability of having the turn-up portions of the carcass ply (or plies) of a pneumatic tire extend radially outwardly of the bead core the shortest possible distance is the premise on which prior art locked beads for passenger car tires were developed. The advantages included improved bead durability, and reduced material costs.

U.S. Pat. No. 4,922,985 discloses a passenger car tire with a carcass ply having a main portion that extends between both beads of the tire and turn-up portions that are anchored around each bead core. Tires according to this prior art and according to U.S. Pat. 5,058,649 have the radially outer edges of the turn-up portions of the carcass ply disposed radially outwardly of the bead cores a minimal distance and are in contact with the main portion of the carcass ply. The turn-up portion of the carcass ply extends radially outwardly of the bead core a minimal distance to allow for some pull-down of the carcass ply during the shaping and curing process.

Components that are usually located in the bead portion of tires include a toe guard and a chafer strip. A toe guard is a layer of reinforcing cords folded around the carcass ply and bead core on the side of the carcass ply furthest away from the bead core. The primary purpose of a toe guard is to protect the bead from damage during mounting of the tire on a rim and subsequent use of the tire on a vehicle. A chafer may be either a tough elastomeric material that protects the bead portion from abrasion during mounting and use of the tire, or a layer of fabric extending from the bead core to about the same radial height as the edge of the turn-up. Suitable elastomeric materials surround the bead core and coat the carcass plies and the breaker plies; other elastomeric components complete the bead portion of the tire.

It is an object of the present invention to provide a tire construction with particularly durable bead portions which are cheap to manufacture. It is a further object of the present invention to improve the locking of at least one of the carcass plies in the bead portion. Other objects of the invention will be apparent from the following description and claims.

DISCLOSURE OF INVENTION

There is provided, in accordance with the invention, a pneumatic tire having (a) a pair of axially spaced apart bead portions with annular bead cores, each bead core having a radial cross-sectional shape which is substantially round or polygonal; and (b) a pair of rubber apex strips of a generally triangular cross-section neighboring the bead cores the apex stripes having a radial height A and extending radially outwardly from the bead cores into the sidewalls of the tire; and (c) at least three sets, a first radially inner, a second intermediate and a third radially outer set of carcass reinforcing structures, having each a main portion extending between the beads and their edges anchored in the beads. The second carcass reinforcing structure is folded radially outwardly around each said bead core, so that the two edges of the second carcass reinforcing structure are located between the apexes and their neighboring bead cores. The third carcass reinforcing structure has its turndown portions folded radially inwardly around the second carcass reinforcing structure and the bead cores, so that the edges of the plies of the third carcass reinforcing structure are located at the radially inner side of the bead cores. The first carcass reinforcing structure has its turnup portions folded radially outwardly around each bead core, the second carcass reinforcing structure and the third carcass reinforcing structure so that the edges of the plies of the first carcass reinforcing structure are located between the radially outer portion of the bead core and the maximum section height of the tire.

There is further provided a pneumatic tire having (a) a pair of axially spaced apart bead portions with annular bead cores, each bead core having a radial cross-sectional shape which is substantially round or polygonal; (b) a pair of rubber apex strips of a generally triangular cross-section neighboring the bead cores, the apex strips having a radial height A and extending radially outwardly from the bead cores into the sidewalls of the tire, (c) a first bead wrap ply structure; (d) at least two sets, a second intermediate and a third radially outer set of carcass reinforcing structures, having each a main portion extending between the beads and their edges anchored in the beads. The second carcass reinforcing structure is folded radially outwardly around each said bead core, so that the two edges of the second carcass reinforcing structure are located between the apexes and their neighboring bead cores. The third carcass reinforcing structure has its turndown portions folded radially inwardly around the second carcass reinforcing structure and the bead cores, so that the edges of the plies of the third carcass reinforcing structure are located at the radially inner side of the bead cores. The first bead wrap ply structure has its turnup portions folded radially outwardly around each bead core, the second carcass reinforcing structure and the third carcass reinforcing structure so that the edges of the plies of the first bead wrap ply structure are located between the radially outer portion of the bead core and the maximum section height of the tire, the first bead wrap ply structure extending axially inward and radially outward from the radially inner portion of the bead core to a radial distance at least one half the radial height of the bead core.

There is still further provided a pneumatic tire having (a) a pair of axially spaced apart bead portions with annular bead cores, each bead core having a radial cross-sectional shape which is substantially round or polygonal; (b) a pair of rubber apex strips of a generally triangular cross-section neighboring the bead cores the apex stripes having a radial height A and extending radially outwardly from the bead cores into the sidewalls of the tire; and (c) a first bead wrap ply structure; (d) at least one set, a second set of carcass reinforcing structures, having a main portion extending between the beads and their edges anchored in the beads. The second carcass reinforcing is folded radially outwardly around each said bead core, so that the two edges of the second carcass reinforcing structure are located between the apexes and their neighboring bead cores. The first bead wrap ply structure has its turnup portions folded radially outwardly around each bead core and the second carcass reinforcing structure so that the edges of the plies of the first bead wrap ply structure are located between the radially outer portion of the bead core and the maximum section height of the tire. The first bead wrap ply structure extends axially inward and radially outward from the radially inner portion of the bead core to a radial distance at least one half the radial height of the bead core.

The invention discloses bead structures having an increased cohesion between the bead core, the carcass plies and the apex through creation of a stiffness gradient between the reinforcement material and the bead core and the rubber of the apex. Furthermore the invention has the bead core act as a pivot, creating thereby a tight interlocking of the carcass plies with the bead core and the apex.

The advantages obtained by the invention are an improved anchoring of the tire structure to the rim. The stress intensive inflection points in carcass bending, located in the upper apex zone in classical prior art constructions, are eliminated trough the concept of a carcass pivoting around the bead core axis. Stress peaks at carcass ply edges are reduced so as to have improved durability of the bead portions. A still further advantage is a reduced occurrence of pulled ply condition in the tire building process.

DEFINITIONS

"Aspect Ratio" means the ratio of its section height (SH) to its section width (SW).

"Axial" and "axially" means the lines or directions that are parallel to the axis of rotation of the tire.

"Bead" means that part of the tire comprising an annular tensile member, the bead core, wrapped by ply cords and shaped, with or without other reinforcement elements such as flippers, chippers, apexes, toe guards and chafers, to fit the design rim. The bead core is usually made of annularly wound steel wire.

"Belt reinforcing structure" means at least two annular layers or plies of parallel cords, woven or unwoven, underlying the tread, unanchored to the bead, and having both left and right cord angles.

"Bias ply" means a tire having bias angled carcass, the angle of the cords being about 35° to 65° relative to the equatorial plane of the tire. Each adjacent ply has cords equal but oppositely oriented.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Equatorial Plane (EP)" means the plane perpendicular to the tire's axis of rotation and passing through the center of its tread.

"Inner" means toward the center of the tire and "outer" means toward its exterior.

"Ply" means a continuous layer of rubber-coated parallel cords. The cords may be of metallic or textile material.

"Radial" and "radially" mean directions radially toward or away from the axis of rotation of the tire.

"Radial ply tire" means a belted or circumferentially-restricted pneumatic tire in which the ply cords which extend from bead to bead are laid at cord angles between 65? and 90? with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

DETAILED DESCRIPTION OF THE INVENTION

Figure 1:
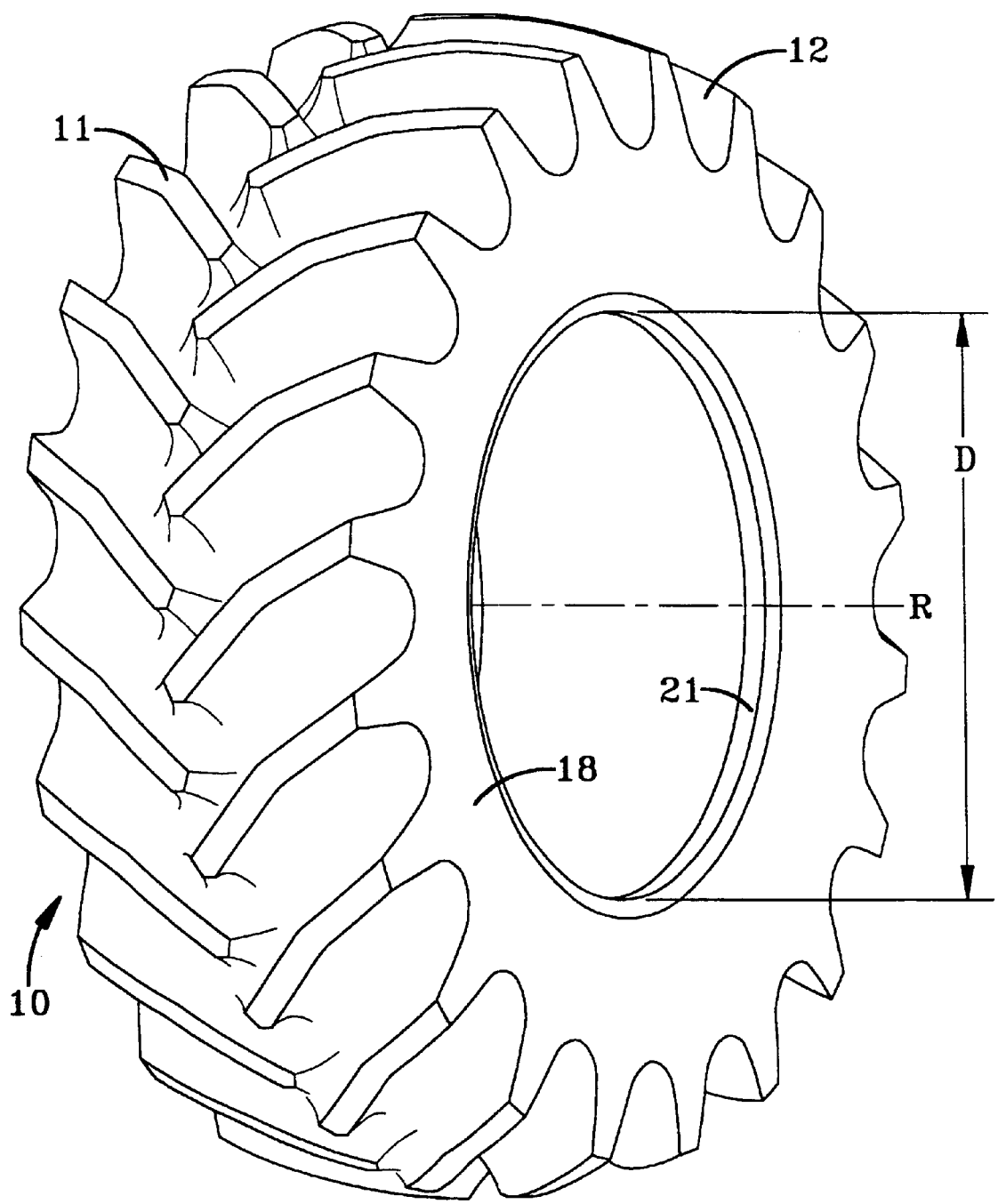
FIG. 1 illustrates a perspective view of a preferred embodiment agricultural tire 10 made in accordance with the present invention.
Figure 2:
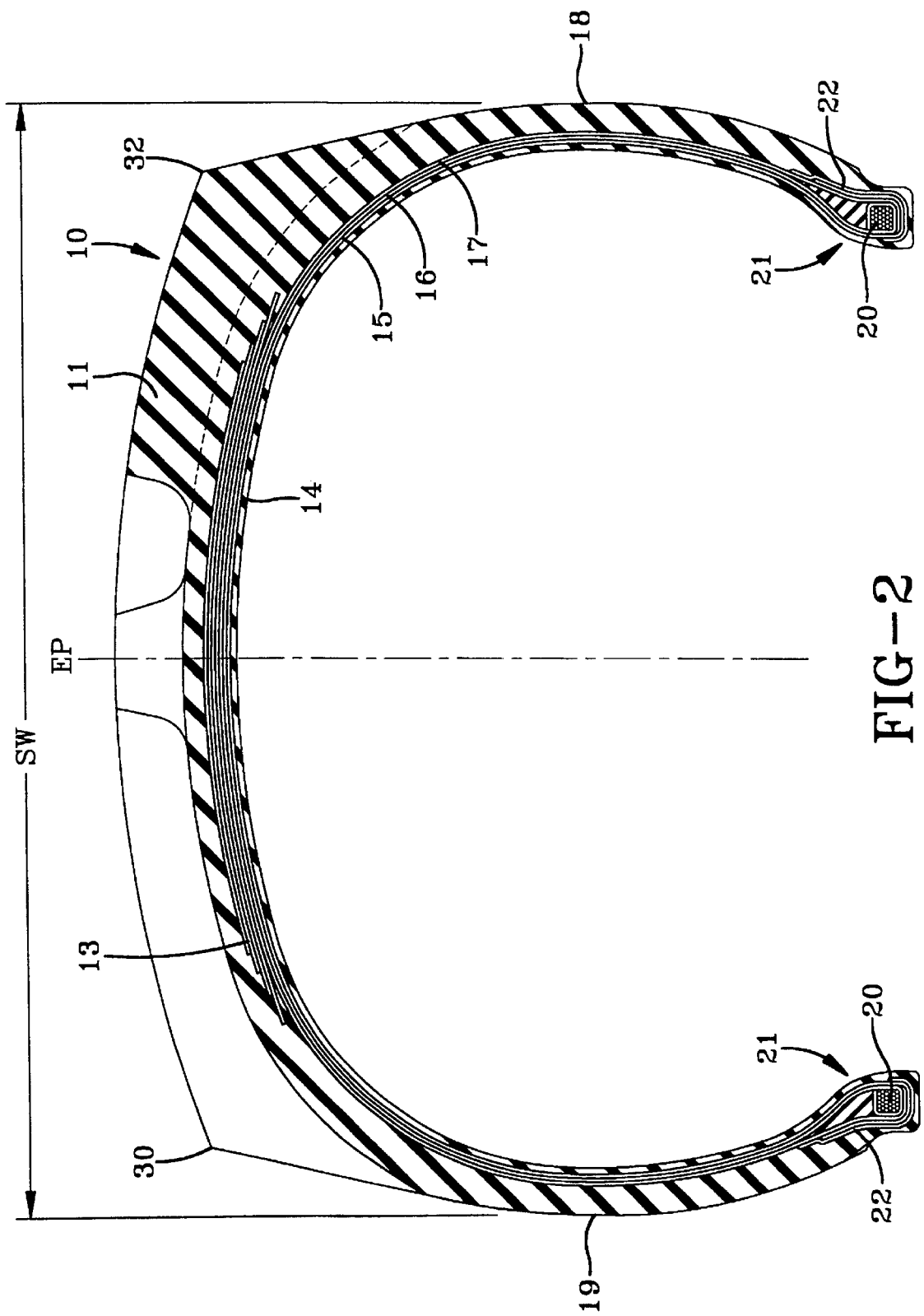
FIG. 2 is a cross-sectional view of the tire 10 of FIG. 1.

With particular reference now to FIGS. 1 and 2 a preferred embodiment of the pneumatic agricultural tire 10 made according to the present invention is illustrated.

The illustrated tire 10 has a nominal rim diameter (D) ranging from 12 to 58 inches (300 to 1475 mm). The tire 10 has an axis of rotation R, an equatorial plane (EP) and a maximum section width (SW).

Placed circumferentially about the radially outer surface of several carcass reinforcing structures 15,16,17 and beneath tread portion 12 provided with lugs 11, is a tread reinforcing belt structure 13. In the particular embodiment illustrated, belt structure 13 comprises four cut belt plies of comparable width. The cords reinforcing the belt plies comprise textile material such as polyester or aramid. The cords of the different belt plies are oriented, with respect to the equatorial plane of the tire, at angles ranging between 15 and 30 degrees and preferably at about 23 degrees. The angles mentioned here are as measured on a cured tire. The cords of two adjacent belt plies are disposed in an opposite direction to the equatorial plane. However, the belt structure 13 may comprise any number of belt plies of any desired configuration and the cords may be disposed at any desired angle.

The radial carcass reinforcing structures 15,16,17 extend from bead portion 21 through sidewall portion 18, tread portion 12, sidewall portion 19 to bead portion 21'. The turnup portions 25,26 and turn down portion 27 of the three carcass reinforcing structures 15,16,17 are wrapped about bead cores 20,20' respectively. The tire 10 may include a conventional inner liner 14 forming the inner peripheral surface of the tire 10 if the tire is to be of the tubeless type.

In the particular embodiment illustrated, there is provided a radially inner first carcass reinforcing structure 15, a second radially intermediate carcass reinforcing structure 16 and a radially outer third carcass reinforcing structure 17. Each of these structures 15,16,17 comprises in the preferred embodiment of the invention one ply or layer of parallel cords. It is to be understood that the invention may also be practiced by using in one or more of the carcass reinforcing structures, two or more plies. The cords of the plies of the carcass reinforcing structures 15,16,17 are oriented at an angle of at least 55 degrees with respect to the equatorial plane of the tire 10. In the particular embodiment illustrated, said cords are oriented at angles ranging between 80 and 90 degrees with respect to the equatorial plane of the tire. The cords may be made of any material which may be used for cord reinforcement of farm tires, for example, and not by way of limitation, steelcord, flexten, rayon, nylon, hyten and polyester and carbon fiber. In the particular embodiment illustrated, the cords are made from 2100/3 nylon and have a lateral spacing of 23 EPI (ends per inch).

Figure 3:
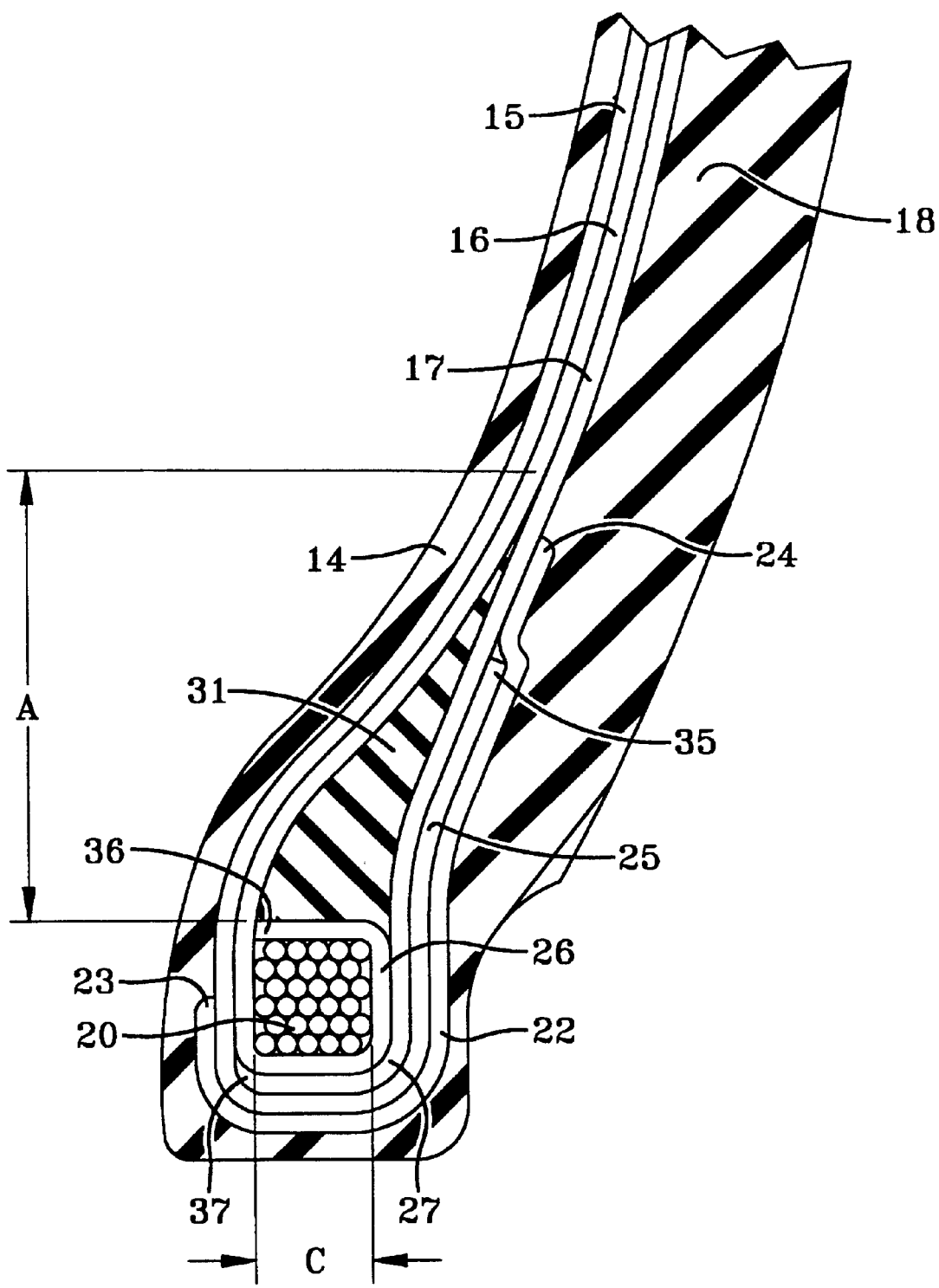
FIG. 3 is a schematic cross-sectional view of one of the two bead portions of a tire according to the present invention.

With particular reference to FIG. 3, the first, second and third carcass reinforcing structures 15,16,17 have turnup portions 25,26 and turndown portion 27 respectively, which wrap about the bead cores 20,20', their main portions extending between the two beads 21,21' of the tire 10. The bead core 20 has a substantially rectangular cross section in the represented embodiment with a maximum axial width C. It is understood that the invention applies equally to bead cores having a round or polygonal section such as a hexagonal section. In the illustrated embodiment the bead core is at least partially reinforced with steel wire and the free spaces between adjacent turns of wire are filled with rubbery material.

Radially outwardly of the bead core, the apex 31 can be distinguished. The apex is made from rubber having a Shore A hardness comprised between 60 and 95 and a maximum axial width B near the bead core, which width can be compared in the illustrated embodiment to the maximum axial width C of the bead core. In farm tires, the apex extends radially from the bead core to a maximum radial height A, which is between 25% and 55% and preferably about 30% of the maximum section height of the tire.

The turnup portion 26 of the second carcass reinforcing structure 16 is folded around the bead core 20 and terminates radially above the bead core. The edge 36 of the second carcass reinforcing structure 16 is located between the apex 31 and its neighboring bead core 20. In a preferred embodiment the edges 36 are close to the main portion of the structure 16 so as to extend on at least 50%, preferably at least 80% of the maximum axial bead core width C between the apex 31 and the bead core 20; this confers an excellent anchoring of the second carcass reinforcing structure around the bead.

The turndown portion 27 of the third carcass reinforcing structure 17 wraps about the second carcass reinforcing structure turnup portion 26 and the bead core 20. The turndown portions 27 are folded radially inwardly around the second carcass reinforcing structure 16 and the bead core 20, so that the edges of the ply(ies) of the third carcass reinforcing structure are located near the axially inner side of the bead core. In the represented embodiment, as the bead is substantially square, the edge 37 of the carcass reinforcing structure 17 is preferably close to radially inner bead core edge. It is equally acceptable to have the edge 37 extend further between the first and second carcass reinforcing structures 15, 16 up to the radially inner portion of the apex 31.

The turnup portion 25 of the first carcass reinforcing structure 15 is folded radially outwardly around each bead core 20, the turnup portion 26 of the second carcass reinforcing structure 16 and the turn down portion 27 of the third carcass reinforcing structure 17 so that the edge 35 of the first carcass reinforcing structure 15 terminates radially outwardly of the apex 31. In the represented embodiment the edge 35 is located at about 80% of the radial height A of the apex 31. Preferably the edge 35 of the first reinforcing structure 15 is located between one third and full radial height A of the apex 31. It should however be noted that in principle the edge 35 can extend much farther into the sidewall 18, 19 of the tire, up to its maximum section width.

The bead portion of the tire comprises further a toe guard 22 whose primary purpose is to protect the bead 21, 21' from damage during mounting of the tire on a rim and subsequent use of the tire on a vehicle. The toe guard rubber is reinforced with textile material, which in the described embodiment is square woven nylon. The inclination of the nylon cords with respect to an axial plane of the tire is not critical and is usually comprised between 35° and 55° degrees. The toe guard 22 is at least partly wound around the first carcass reinforcing structure 15 in the bead portion 21 of the tire so that its radial inner edge 23 is located at about 50% of the radial extend of the axially inner bead core portion and its radially outer edge 24 above the maximum radial extend of the axially outer bead core portion. It should be avoided to have the radially outer edge 24 of the toe guard close to the radially outer edge 35 of the first carcass reinforcing structure 15; such neighborhood and the resulting shear stresses could lead to ply separation problems. In the represented embodiment the toe guard 22 covers the edge 35 of the first carcass reinforcing structure 15 and the radially outer edge 24 of the toe guard 22 is close to the radially outer edge of the apex 31. This toe guard 22 alternatively can be a bead wrapping ply structure 22 as discussed below.

Figure 4:
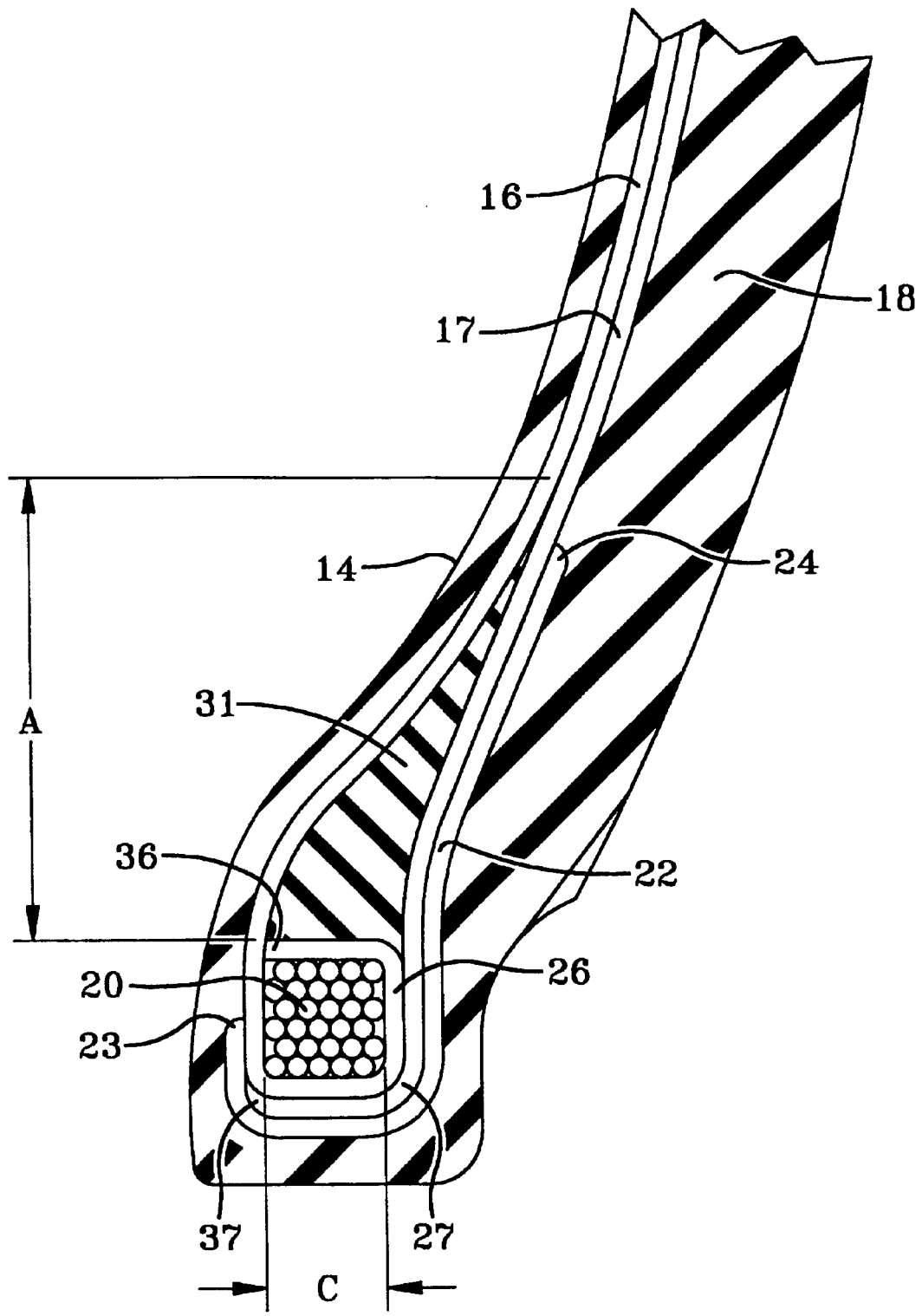
FIGS. 4 and 5 are schematic cross-sectional views of one of two bead portions of alternative embodiment tires.

Though the invention is particularly advantageous in farm tires, it can be contemplated to implement such bead construction in bias tires or in any other tire having at least two carcass reinforcing structures as shown in FIG. 4. Depending on the strength required for the carcass and the reinforcement material chosen, the different structures may then comprise one, two or more reinforcing plies. As shown in FIG. 4 the first ply structure has been replaced with a first bead wrap ply structure 22 referred to earlier as the toe guard 22 of FIG. 3. The first bead wrap ply structure can have cords radially extending or may compromise to bias layers of plies. In any case the structure permits fewer plies to be employed.

Figure 5:
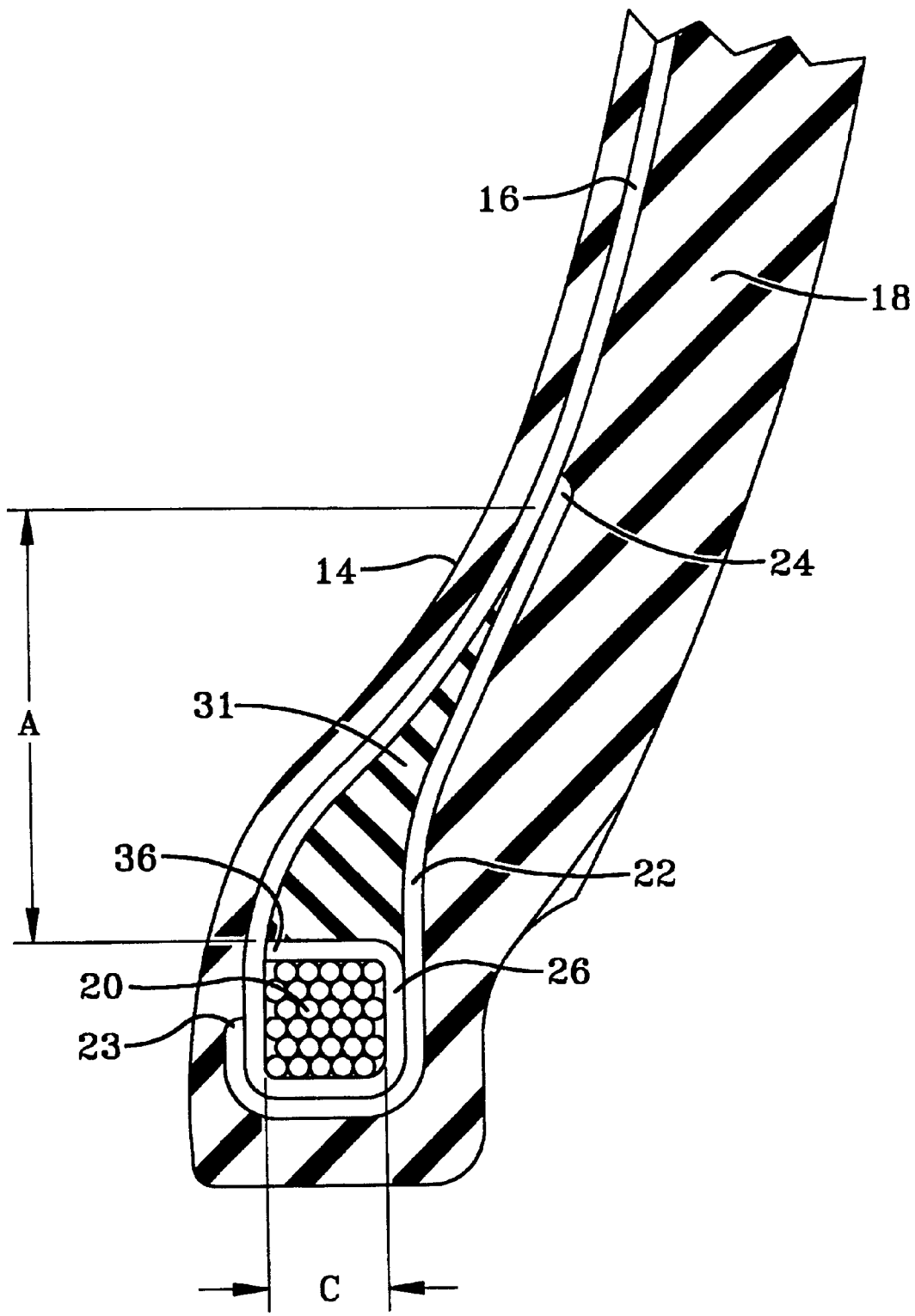

As noted it is contemplated that third ply structures could also be eliminated by employing only the bead wrap ply structure 22 and the second ply structure. FIG. 5 illustrates that the invention contemplates as few as one second ply structure 16 and the aforementioned first bead wrap ply structure 22.

While certain representative embodiments and details have been shown for the purpose of illustrating the invention, it will be apparent to those skilled in the art that further changes and modifications may be made therein without deviating from the scope of the invention as defined in the appended claims.

What is claimed is:

1. A pneumatic tire having:
    (a) a pair of axially spaced apart bead portions with annular bead cores, each bead core having a radial cross-sectional shape which is substantially round or polygonal;
    (b) a pair of rubber apex strips of a generally triangular cross-section neighboring the bead cores the apex strips having a radial height A and extending radially outwardly from the bead cores into the sidewalls of the tire; and
    (c) at least three sets, a first radially inner, a second intermediate and a third radially outer set of carcass reinforcing structures, having each a main portion extending between the beads and their edges anchored in the beads, the tire characterized by;
        the first carcass reinforcing structure being folded radially outwardly around each said bead core. so that the two edges of the second carcass reinforcing structure are located between the apexes and their neighboring bead cores;

the second carcass reinforcing structure having turndown portions folded radially inwardly around the second carcass reinforcing structure and the bead cores, so that the edges of the plies of the third carcass reinforcing structure are located near the axially inner side of the bead cores;

the third carcass reinforcing structure having turnup portions folded radially outwardly around each bead core, the second carcass reinforcing structure and the third carcass reinforcing structure so that the edges of the plies of the first carcass reinforcing structure are located between the radially outer portion of the bead core and the maximum section height of the tire.

2. The pneumatic tire of claim 1 wherein the first, second and third carcass reinforcing structure comprise each one ply.

3. The pneumatic tire of claim 2 wherein the edges of the plies of the first carcass reinforcing structure are located between one third and full radial height A of the apex strips.

4. The pneumatic tire of claim 1 wherein the apex strip extends radially from the bead core to a maximum height between 25% and 55% of the maximum section height of the tire.

5. The pneumatic tire of claim 1 wherein the apex strip extends radially from the bead core to about 3000 of the maximum section height of the tire.

6. The pneumatic tire of claim 1 wherein the carcass reinforcing structures are reinforced with nylon cords.

7. The pneumatic tire of claim 6, wherein each bead core has a cross-sectional shape which is substantially rectangular.

8. The pneumatic tire of claim 7, wherein the turnup portions of the second carcass reinforcing structure extend on at least 50% of the maximum axial bead core width C.

9. The pneumatic tire of claim 1, wherein each bead core is at least partially reinforced with steel wire.

10. The pneumatic tire of claim 1 wherein each bead core has a cross-sectional shape which is substantially polygonal.

11. The pneumatic tire of claim 1, wherein the edges of the plies of the third carcass reinforcing structure are located near the radially inner edges of the bead cores.

12. The pneumatic tire of claim 1, wherein the bead portio[008e] comprises a toe guard which is at least partly wound around the bead core so as to cover the edge of the first carcass reinforcing structure furthest away from the bead core.

13. A pneumatic tire having:

(a) a pair of axially spaced apart bead portions with annular bead cores, each bead core having a radial crop sectional shape which is substantially round or polygonal;

(b) a pair of rubber apex strips of a generally triangular cross section neighboring the bead cores the apex strips having a radial height A and extending radially outwardly from the bead cores into the sidewalls of the tire;

(c) a bead wrap ply structure;

(d) at least two sets, a first radially inner and a second radially outer set of carcass reinforcing structures, having each a main portion extending between the beads and their edges anchored in the beads, the tire characterized by:

the first carcass reinforcing structure being folded radially outwardly around each said bead core, so that the two edges of the first carcass reinforcing structure are located between the apexes and their neighboring bead cores;

the second carcass reinforcing structure having turndown portions folded radially inwardly around the first carcass reinforcing structure and the bead cores, so that the edges of the plies of the second carcass reinforcing structure are located near the axially inner side of the bead cores;

the bead wrap ply structure having turnup portions folded radially outwardly around each bead core, the first carcass reinforcing structure and the second carcass reinforcing structure so that the edges of the plies of the bead wrap ply structure are located between the radially outer portion of the bead core and the maximum section height of the tire, the bead wrap ply structure extending axially inward and radially outward from the radially inner portion of the bead core to a radial distance at least one half the radial height of the bead core.

* * * * *